Aug. 19, 1958    H. A. QUIST    2,848,011
JET ACTION RELIEF VALVE
Filed March 1, 1957    3 Sheets-Sheet 1

INVENTOR.
HAROLD A. QUIST
BY Robert O. Spindle
ATTORNEY

Aug. 19, 1958  H. A. QUIST  2,848,011
JET ACTION RELIEF VALVE
Filed March 1, 1957  3 Sheets-Sheet 2

INVENTOR.
HAROLD A. QUIST
BY Robert O. Spindle
ATTORNEY

United States Patent Office 2,848,011
Patented Aug. 19, 1958

2,848,011

JET ACTION RELIEF VALVE

Harold A. Quist, Swarthmore, Pa., assignor to Sun Oil Company, Philadelphia, Pa., a corporation of New Jersey Application March 1, 1957, Serial No. 643,406

6 Claims. (Cl. 137—248)

This invention relates to pressure operated devices in general and more particularly to pressure responsive valves adapted to relieve excessive pressure and vacuum conditions arising in vessels used for the storage of liquids.

Pressure and vacuum operated mechanisms for relief of storage vessels are well known in the chemical and petroleum industries. As used in these industries, and specifically in this disclosure, the terms "pressure" and "vacuum" are intended to mean pressures above and below a chosen datum such as atmospheric pressure which is most commonly used. Reciprocating or rotating relief valves operating in conjunction with liquid seals are shown in this art to assume many different forms with distinctive operating means. In some instances they respond directly to the pressure conditions existing in the storage vessels, while in other instances the relief valve is operated by an auxiliary mechanism. It is to liquid sealed devices of the latter class that this disclosure is directed.

Where actuators are used to deliver operating pressures to relief valves, they are adapted primarily to direct pressure or vacuum in such manner as to operate the valve most advantageously. This is accomplished by directing the operating pressure condition, either pressure or vacuum from the responding actuator or part thereof where one only is used, to the valve operator. The pressure condition to be relieved operates the valve.

It is an object of this invention to provide a valve adapted to relieve vacuum conditions directly from the storage vessel and using the same valve to relieve pressure conditions by converting that pressure condition into a vacuum operating effect before delivery to the vacuum responsive valve.

By reducing the operating relief characteristics for the valve to one condition, namely, vacuum, instead of the usual vacuum and pressure requirements, greater accuracy of operation and increased sensitivity are obtained. Further, where the relief valve is always open to meet one venting requirement without intervening equipment, there is a reduction in the number of necessary parts to form the device with subsequent savings in initial and operating costs. It is therefore a further object of this invention to provide a simplified form of actuator-relief valve combination to relieve pressure-vacuum conditions arising in liquid storage vessels, yet preserving a high degree of accuracy and sensitivity.

In accordance with the present invention a liquid sealed valve of the inverted cup type is pivoted to vent vacuum conditions delivered directly to it from a liquid storage vessel. An actuator, responsive to cooperate with the vacuum operated valve only when operated by pressure conditions and normally inoperative under vacuum conditions, controls a jet element. The jet is connected to the relief valve in a manner to draw a negative or vacuum pressure and cause the valve to operate, relieving the pressure of the storage vessel.

For a more complete understanding of the nature and scope of the invention in which the above-noted objects and others will be evident, reference is made to the following detailed description, read in conjunction with the accompanying drawing in which.

Figure 1:
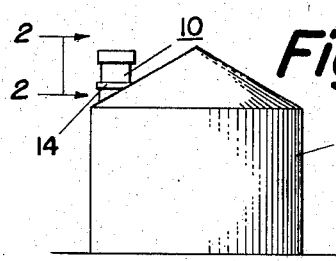
Figure 1 is an elevational view showing the device mounted on a liquid storage vessel in operating position.

From the above descriptions of the figures of the drawing, it will be evident that the embodiment illustrated in Figures 1 through 6 is the preferred form. It is compact in all dimensions, making an attractive, efficient mechanism. However, it is equally evident, as suggested in operational Figures 7 and 8, that the separate elements may be separated, widely if desired, and still be cooperatively responsive to serve the desired purpose. With these evidences of installation flexibility, the device will be described in detail with little reference to any requirements of relative proximity of moving parts.

Figure 1 shows the device, generally denoted by the numeral 10, in operating position on the roof of storage tank 12. Because of its compactness, the complete device is easily mounted on a manhole cover 14 normally standard equipment with such tanks.

Figure 2:
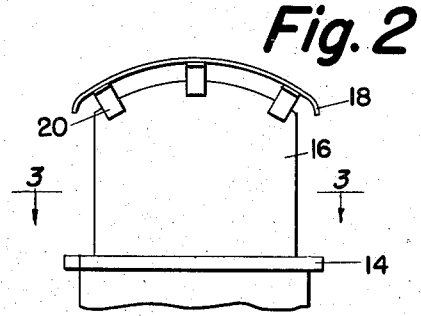
Figure 2 is an end elevational view of the housing in which to mount the operating elements taken as indicated by lines 2—2 on Figure 1.

An end view of the device 10, as mounted on tank 12, is shown to a little larger scale in Figure 2. The housing 16, for the operating mechanism to be described later, is covered by a hood 18 mounted by straps or fasteners 20. As indicated in the sectional views, shown in Figures 4 through 8, the housing 16 supports a volume of sealing liquid 22 of sufficient depth to receive the valve and actuator elements in a sealed position, and also preferably to cover the pivotal supports for these elements, all to be described later.

Figure 3:
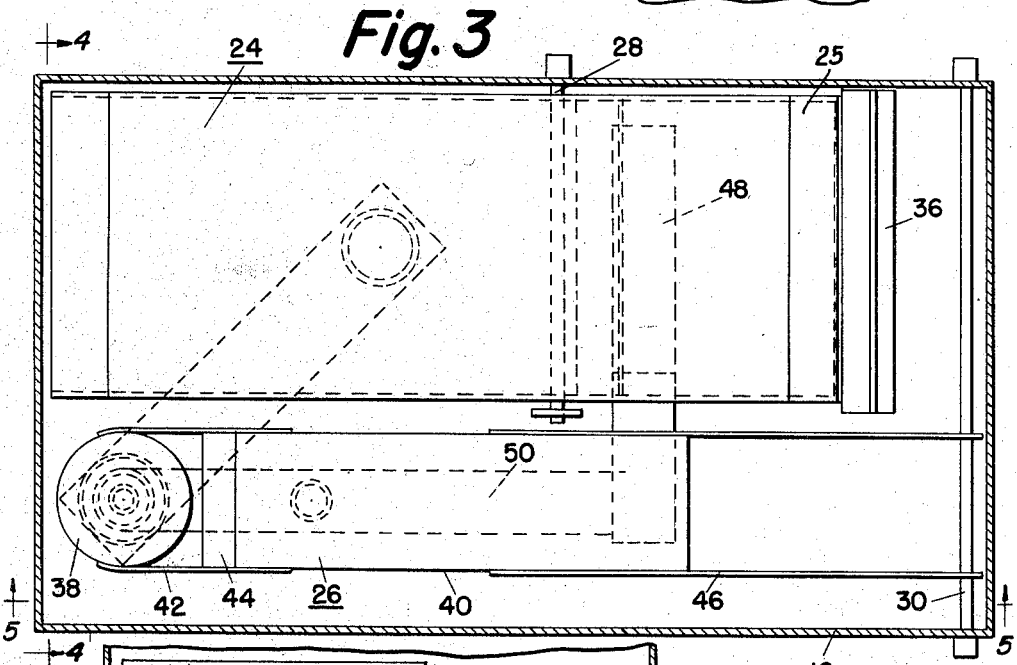
Figure 3 is a plan view of the operating elements in preferred assembled position taken on lines 3—3 on Figure 2.
Figure 4:
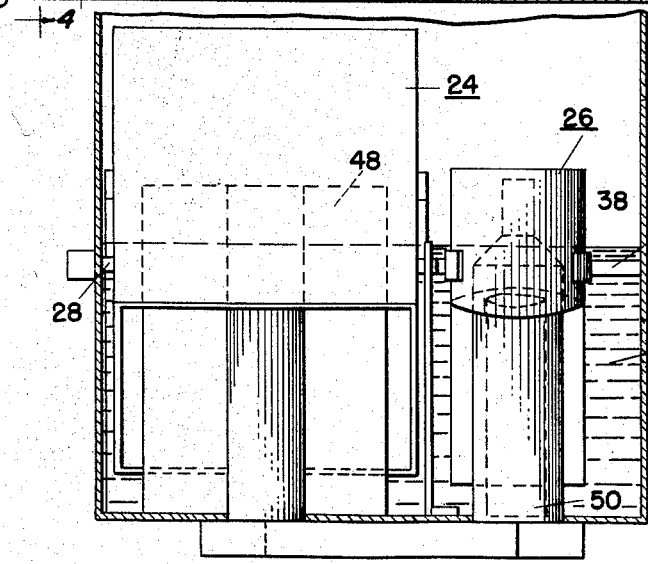
Figure 4 is an elevational view, partly in section, of one end of the asssembly as indicated by line 4—4 in Figure 3.
Figure 5:
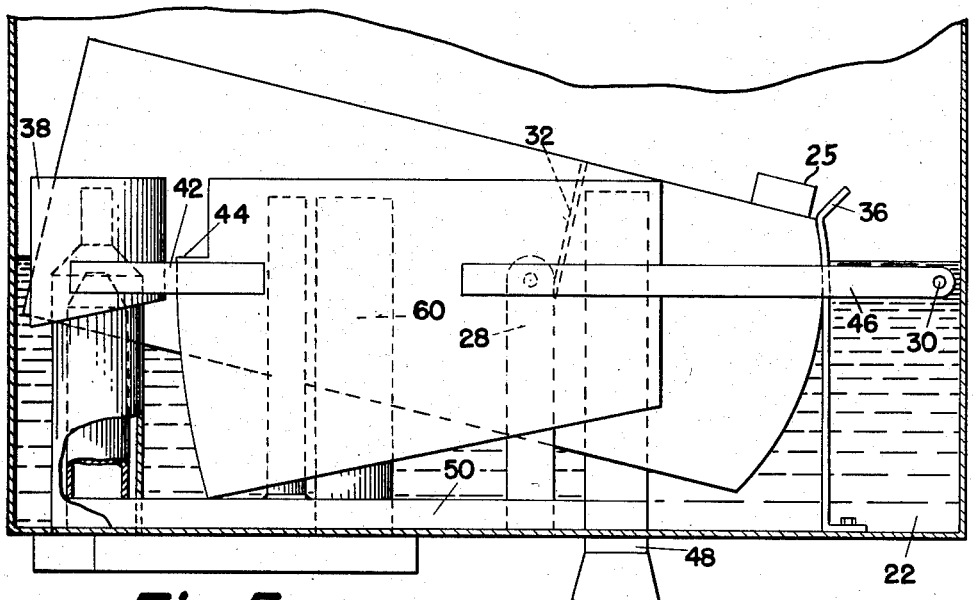
Figure 5 is an elevational view, partly in section, of one side of the assembly as indicated by line 5—5 on Figure 3.

As generally described above, the operating elements enclosed in the housing 16 include an inverted cup form of relief valve 24 and an actuator 26. Figure 3 shows these two elements to be pivotally supported for operable engagement with the sealing liquid 22. Inverted cup relief valve 24 is mounted on pivot 28 which is positioned to proportion the valve into unequal sections for satisfactory operation. Actuator 26 engages pivot 30 at the end of the housing forming a long leverage with resulting full arcuate movement made possible.

Further details of the relief valve 24 structure are shown in Figures 4 through 8, as well as in Figure 3. More clearly shown in Figures 5 to 8 is the partition 32, which divides the valve 24 into two chambers 31 and 33 of unequal size. The aperture 34, through which the valve releases and receives balancing pressure effects, is clearly shown in Figures 7 and 8, while an anti-splash shield 36 is clearly shown in Figures 3 and 5 to 8. The pressure transmitting means shown in these figures as conduits, ducts, a flue and a jet, although indicated in these figures in varying stages of clarity, will be described with better continuity after the actuator 26 is understood.

With the exception of the first two figures, the actuator 26 is illustrated in different degrees of clarity. The side elevation, perspective and operating views of Figures 5 to 8, respectively, are clearer than Figures 3 and 4, but all will be numbered as the elements are described. Actuator 26 is divided into two operating volumes represented by inverted cup 38 and a larger inverted cup 40. These cups are spaced from each other, longitudinally, by brackets 42. By such construction an accelerating area 44 can be built into cup 40. The cups 38 and 40 are then spaced for operation about the pivot 30 by connecting brackets 46.

As stated immediately above in describing the actuator 26, all the figures excepting the first two, will help in clarifying the piping arrangement by which the operating pressures move from the storage tank to the valve 24 and actuator 26. The flue 48 extends from below the manhole cover 14 upward through the housing 16, sealing liquid 22 and vents above the liquid in chamber 33 of the relief valve 24. A duct 50, above the bottom of the housing 16, connects flue 48 with venturi 52 of the jet assembly 54. Venturi 52 of jet 54 is enclosed, concentrically by gas duct 56 which opens under cup 38, and above the sealing liquid, of the actuator. The bottom of gas duct 56 is connected by duct 58 passing under the bottom of the housing 16 at different elevation from duct 50, to conduit 60 which opens into the larger chamber 31 of the relief valve 24. Finally another conduit 62 connects duct 50 with inverted cup 40 of the actuator 26.

Before describing the operation of the device for relief of both vacuum and pressure conditions, several general observations will assist in clarifying the fact that relief valve 24 responds to vacuum conditions for both circumstances. It will be observed that both the valve 24 and actuator 26 are pivotally operable into and from sealing liquid 22 only to a limited extent. By construction, inverted cup 40 of the actuator never leaves the liquid always enclosing conduit 62 therein in sealing relation. This sealed condition is always true of conduit 60 which extends into chamber 31 of valve 24 which also never leaves the sealing liquid, by construction.

Extending the observations to include the second cup numbered 38 of actuator 26, it will be understood that jet 54 would be exposed to vent into atmosphere when that cup is lifted sufficiently far. This condition is illustrated in Figure 7. And, lastly, in these general observations the valve 24 is designed to relieve tank conditions through only one passage which is aperture 34 positioned to vent chamber 33 for all conditions. This aperture 34 is normally submerged in liquid 22 as clearly shown in Figures 5 and 6. Valve 24 assumes the normal position of these figures by construction, symbolized by added weight 25.

Figure 8:
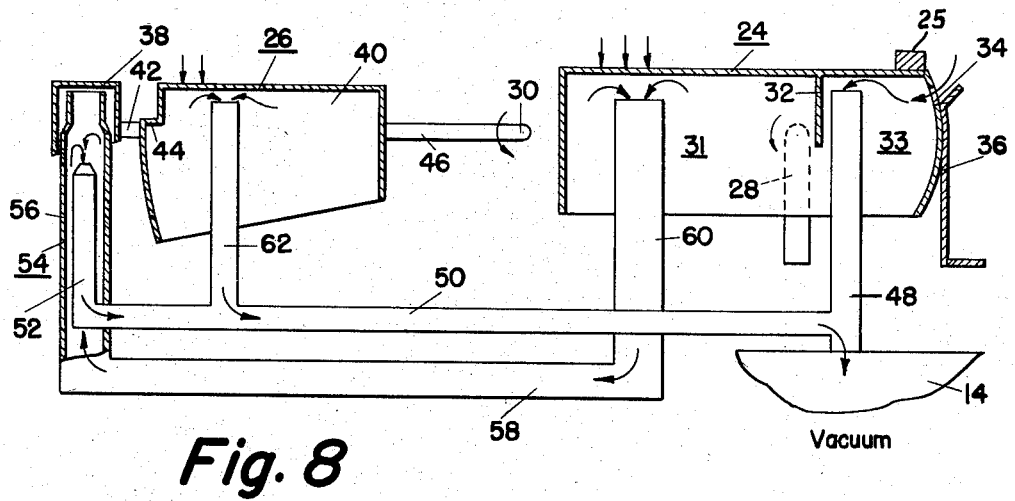
Figure 8 is an elevational view obtained in a fashion like that described for Figure 7, where the elements are shown relieving vacuum conditions.

Although a lower numbered figure, number 7 illustrates one operating condition before another shown in Figure 8, it is proposed to describe the condition in in Figure 8 first. This is decided because relief of a vacuum condition is shown in Figure 8 which is accomplished solely through the relief valve 24 without the assistance of the actuator 26. An understanding of the vacuum relief operation will greatly assist in understanding the pressure release operation.

A vacuum condition arising in the storage vessel such as caused by decrease in temperature or pumping-out operations, the reduced pressure in the tank affects the pressures in the relief device 10, as indicated by the arrows in Figure 8. Immediately a reduced pressure condition is transmitted to chamber 33 of relief valve 24, tending to rotate the valve body in a clockwise direction about pivot 28. This moves aperture 34 deeper in sealing liquid 22.

However, this tendency is only momentary, for the same degree of reduced pressure is being passed through duct 50 to conduit 62 and venturi 52. As observed above, cup 40 is always sealed and receives the full affect of all pressures delivered through conduit 62. Cup 40 is soon exhausted of its relief possibilities and the full force of the negative pressure becomes effective through venturi 52. As inverted cup 38 of actuator 26 is in sealing engagement with liquid seal 22 over the open end of gas conductor 56, the negative pressure effect is transmitted to chamber 31 of the valve 24 through duct 58 and conduit 60.

At this point in the operation it will be realized that the same pressure effect is now existing in both chambers 31 and 33 of valve 24. As stated above, the vacuum in chamber 33 only sealed the valve tighter as it tended to rotate the valve clockwise. However, as described above, and indicated in the drawing, chamber 31 is larger than chamber 33, approaching a lever twice as great in one than the other. As the width is the same, although it could be varied if desired, there is approximately twice as much force brought to bear by atmospheric pressure on the exposed area of valve 24, causing the valve to rotate counterclockwise about pivot 28, lifting aperture 34 from the sealing liquid and admitting atmospheric pressure to the storage vessel through flue 48. The slope of the splash shield 36 at the liquid level is designed to prevent intake of either liquid as such or entrained droplets. When the vacuum condition is relieved the valve returns to normal position shown in Figure 6.

Figure 6:
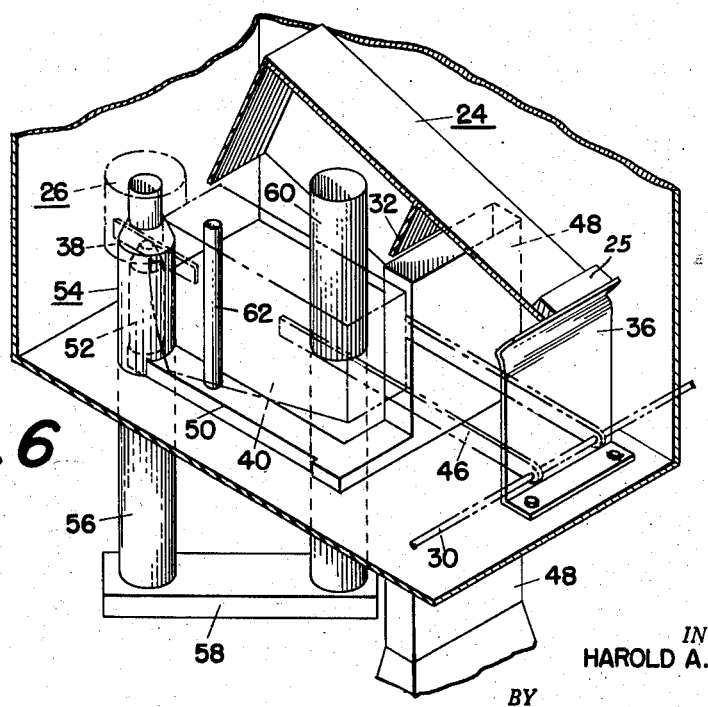
Figure 6 is a perspective view of the operating assembly, partly in section and phantom line, with an offset of some elements to aid in clarifying the description of the device.
Figure 7:
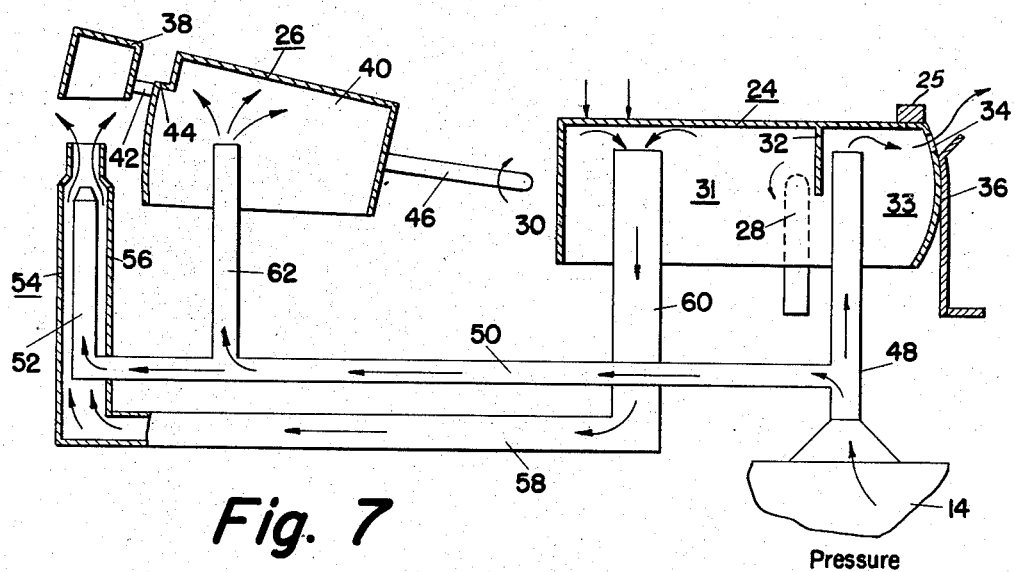
Figure 7 is an elevational view of the operating elements of the device rotated away from their adjacent positions into the plane of the drawing for purposes of better describing the operation under pressure relieving conditions.

Conditions of pressure existing in the storage tank normally start the disclosed device into relieving operation from the normal position shown in Figure 6. From that normal position where valve 24 is, by construction, weighted to normally remain in sealing engagement with liquid 22, aperture 34 immersed behind shield 36, the elements are moved to full venting position illustrated in Figure 7.

Initially the pressure condition is transmitted through flue 48 to chamber 33 of valve 24. Because of pivot 28 location, valve dimensions and the weight distribution of the valve, this pressure condition is not strong enough to immediately drive the valve to the open position. Nor is the effect of the atmospheric pressure alone on the larger section of the valve added to the pressure in chamber 33 sufficient to lift the aperture 34 above the sealing liquid. However, similar to the action explained above, the pressure condition is rapidly spreading through duct 50 to conduit 62 and vents into liquid sealed cup 40 of the actuator mechanism. Actuator 26 lifts exposing the open end of jet 54 which is now receiving the full effect of the storage tank pressure through venturi 52.

As the pressure condition rushes through venturi 52 a suction is created in gas conductor 56 which extends through duct 58, conduit 60 into chamber 31. A negative pressure, or as conducted here, a vacuum, condition is created in this valve chamber through the action of jet 54. The valve 24 pressured from outside by atmospheric conditions which is now definitely effective because of the vacuum condition created in chamber 31 by the jet action, assisted by the pressure in chamber 33, immediately moves in a counterclockwise direction to expose aperture 34 to the pressure relieving position. The splash shield 36 covers aperture 34 until it is clear of the liquid and directs the escaping gases upwardly away from the sealing liquid surface, eliminating splashing and conserving the sealing liquid supply. On exhaust of the operating pressure condition, the valve and actuator return to the normal position.

This pressure relieving operation, as described requires the cooperation of the actuator, not necessary in the vacuum release function. The movement of the pressured actuator from sealing position in the liquid is restrained in the sealing position, and accentuated in the operating action by means of the offset 44. At the beginning of the actuator operation offset 44 is submerged, leaving the area of cup 40, less the offset area, exposed to tank pressure effect. Cup 40 starts to lift slowly. When the offset 44 breaks the surface of the liquid the operating surface of cup 40 is augmented by offset 44 area, accelerating the lifting movement by the effect of tank pressure on this added area. The opening of the actuator will be swift and positive.

On closing, the opposite effect of this operation is experienced. When the liquid level is reached by the underside of the offset, the pressure effect is reduced in force by decreasing the area affected and thus the cup moves downwardly into the normal position with positive action, eliminating splashing and chattering.

In summary, a vacuum relief valve directly responsive to that condition is permitted to operate for such purpose without any additional equipment. By means of a jet properly inserted in the pressure escaping elements, and controllably operated in conjunction with the valve, operates that valve on vacuum principles to relieve pressures. With the disclosure here of an operating form, it will be immediately clear to those versed in the art that rearrangement and substitution of elements are both possible and in some instances desirable. All such substitutions and changes are contemplated by the inventor except as limited expressly in the accompanying claims.

I claim:

1. A pressure-vacuum relief system for a receptacle comprising a vacuum relief valve having a vacuum responsive operating portion and a valve portion operatively connecting the interior of said receptacle with the atmosphere, a pressure responsive actuator operatively connected to a pressure relief valve connecting the interior of the receptacle with the atmosphere, jet means controlled by the pressure relief valve, and conduit means between the jet and said vacuum responsive operating portion of the vacuum relief valve positioned relative to the jet to transmit a vacuum operating condition to said operating portion as the jet relieves receptacle pressure through said pressure relief valve, thereby operating the vacuum relief valve for pressure venting.

2. A pressure-vacuum relief system for a receptacle comprising a reciprocating liquid sealed vacuum relief valve having a vacuum responsive operating portion and a valve portion operably connecting the interior of the receptacle with the atmosphere, a pressure-responsive actuating means positioned for operating connection with said vacuum relief valve; jet means adapted to vent receptacle pressure; jet control means operably connected to the pressure responsive actuating means; conduit means connecting the vacuum relief valve to said jet means thereby transmitting an operating vacuum condition to the vacuum responsive operating portion of said valve while venting pressure through the jet operating the vacuum relief valve to relieve pressure conditions in the receptacle.

3. The pressure-vacuum relief system of claim 2 further characterized in that the pressure responsive actuating means and the jet control means operably connected thereto includes a pivoted frame supporting two inverted cups in spaced relation with the pivot and each other and normally in sealed engagement with the sealing liquid, the cup nearest the pivot being the pressure responsive actuating means adapted to receive pressure from the storage tank, and the furthermost cup inverted over the jet means being the jet control means, transferring vacuum conditions to the vacuum responsive operating portion of the vacuum relief valve in the sealed position and on uncovering the jet, relieving pressure through said jet and creating an operating vacuum in the vacuum responsive portion of said valve and relieving pressure through the valve portion thereof.

4. A pressure-vacuum relief system for a receptacle comprising a reciprocating liquid sealed vacuum responsive relief valve having a vacuum responsive operating portion and a valve portion operably connecting the interior of said receptacle with the atmosphere, a liquid sealed actuator means communicating with the interior of the receptacle and operably responsive to pressure conditions arising therein, a jet means connecting the interior of the receptacle with the atmosphere, jet control means operated by the actuator means for the relief of pressure conditions through the jet means; conduit means connecting the negative pressure area of the jet means with the vacuum responsive operating portion of the relief valve transmitting said negative jet effect as a vacuum operating condition to the operating portion of said relief valve operating the same to relieve pressure conditions through said valve portion.

5. A pressure-vacuum relief device for storage receptacles comprising a hooded housing containing liquid in the bottom thereof, a receptacle venting conduit extending through the housing to terminate above the liquid, an elongate inverted cup valve divided into a vacuum responsive operating chamber and a relief chamber pivotally suspended in sealing engagement with the liquid with the relief chamber receiving the receptacle venting conduit; jet means connected to the receptacle and extending above the sealing liquid in the housing, means adjacent said cup valve controlling the escape of pressure through said jet in response to receptacle pressure conditions and conduit means operatively associated with said jet and extending into the vacuum operating chamber of the inverted cup to transmit an operating vacuum condition to operate the valve in proportion to the jet effect of escaping pressure.

6. A pressure-vacuum relief device for use with storage receptacles comprising a hooded housing containing a liquid in the lower portion thereof; an inverted cup valve pivotally suspended in sealing engagement with the liquid and transversely partitioned into a pressure-vacuum relief chamber being apertured to open when pivotally lifted from the sealing liquid and a vacuum responsive operating chamber; a flue connecting the storage receptacle with the pressure-vacuum relief chamber above the sealing liquid level; a pressure responsive actuator of two inverted cups in spaced relation from a pivotal support and joined to operate together, the cup nearest the pivot being a pressure actuating cup and lifting the other cup which is a pressure relief cup into pressure relieving position; a conduit transmitting the receptacle conditions to the pressure actuating cup, a jet means extending from said conduit into the pressure relief cup above the sealing liquid level, a cross conduit concentric with the jet and forming an annular space therewith at the jet aperture, said cross conduit transmitting the jet suction effect to the vacuum responsive operation chamber of the inverted cup valve operating the same to relieve receptacle pressure conditions.

No references cited.